US012798502B2

(12) United States Patent
Hashizume et al.

(10) Patent No.: US 12,798,502 B2
(45) Date of Patent: Nov. 17, 2026

(54) VEHICLE CONTROL UNIT FOR RESTRICTING OPERATION OF FUNCTIONAL UNIT(S) ACCORDING TO A DETERMINED IMPORTANCE

(71) Applicant: DENSO CORPORATION, Kariya-city (JP)

(72) Inventors: Takashi Hashizume, Kariya-city (JP); Takahiro Sumiyoshi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 720 days.

(21) Appl. No.: 17/373,913

(22) Filed: Jul. 13, 2021

(65) Prior Publication Data

US 2021/0339691 A1 Nov. 4, 2021

Related U.S. Application Data

(63) Continuation of application No. PCT/JP2019/050353, filed on Dec. 23, 2019.

(30) Foreign Application Priority Data

Jan. 16, 2019 (JP) ................................ 2019-005161

(51) Int. Cl.
*B60R 16/023* (2006.01)
*B60R 16/03* (2006.01)

(52) U.S. Cl.
CPC ...... *B60R 16/0232* (2013.01); *B60R 16/0315* (2013.01)

(58) Field of Classification Search
CPC ............ B60R 16/0232; B60R 16/0315; B60R 16/023
USPC ........................................................ 701/29.2
See application file for complete search history.

(56) References Cited

U.S. PATENT DOCUMENTS 5,414,416 A 5/1995 Yamakita et al.
9,756,693 B1 * 9/2017 Klyn ...................... H05B 45/10
11,961,342 B2 * 4/2024 Iijima ................. B60W 50/029
2002/0113441 A1 8/2002 Obayashi
2002/0140548 A1 * 10/2002 Lutter .................... G08G 1/162 340/425.5
2007/0102212 A1 * 5/2007 Idone ...................... B60R 16/03 180/65.8
2013/0134933 A1 5/2013 Drew et al.
(Continued)

FOREIGN PATENT DOCUMENTS

JP H0937459 A 2/1997
JP 2002-199505 A 7/2002
(Continued)

*Primary Examiner* — Abby J Flynn
*Assistant Examiner* — Sean Patrick Reidy
(74) *Attorney, Agent, or Firm* — Harness, Dickey & Pierce, P.L.C.

(57) ABSTRACT

The vehicle control unit includes: a plurality of functional units mounted on the vehicle; a temperature detection unit for detecting temperature; and a controller for controlling an operation of each functional unit. An importance is set for each of the functional units, and the controller executes the operation restriction process that restricts the operation of each functional unit having a low importance according to the temperature detected by the temperature detection unit.

4 Claims, 3 Drawing Sheets

| | COMPLIANCE WITH REGULATIONS | USER RECOGNITION | USER REQUIREMENT | INTERNAL INFLUENCE | IMPORTANCE |
|---|---|---|---|---|---|
| MAIN CONTROL UNIT | 5 | 5 | 5 | 5 | 20 |
| METER FUNCTION UNIT | 5 | 5 | 5 | 0 | 15 |
| INFOTAINMENT FUNCTION UNIT | 0 | 3 | 1 | 0 | 4 |
| SOUND OUTPUT UNIT | 0 | 5 | 1 | 0 | 6 |
| WIRELESS COMMUNICATION UNIT | 0 | 1 | 1 | 0 | 2 |

(56) References Cited

U.S. PATENT DOCUMENTS

| | | | | |
|---|---|---|---|---|
| 2014/0277995 | A1* | 9/2014 | Slaton | F02D 41/22 701/1 |
| 2016/0013629 | A1* | 1/2016 | Nagatomo | H02H 5/04 361/93.8 |
| 2017/0219659 | A1 | 8/2017 | Ishikawa | |
| 2018/0370466 | A1* | 12/2018 | Murata | E05F 15/695 |
| 2019/0073840 | A1* | 3/2019 | Voigt | H04W 4/024 |

FOREIGN PATENT DOCUMENTS

| | | | |
|---|---|---|---|
| JP | 2003072487 | A | 3/2003 |
| JP | 2008293222 | A | 12/2008 |
| JP | 2013118798 | A | 6/2013 |
| JP | 2016132261 | A | 7/2016 |
| JP | 2017138182 | A | 8/2017 |
| WO | WO-9304896 | A1 | 3/1993 |

* cited by examiner

FIG. 2

| | COMPLIANCE WITH REGULATIONS | USER RECOGNITION | USER REQUIREMENT | INTERNAL INFLUENCE | IMPORTANCE |
|---|---|---|---|---|---|
| MAIN CONTROL UNIT | 5 | 5 | 5 | 5 | 20 |
| METER FUNCTION UNIT | 5 | 5 | 5 | 0 | 15 |
| INFOTAINMENT FUNCTION UNIT | 0 | 3 | 1 | 0 | 4 |
| SOUND OUTPUT UNIT | 0 | 5 | 1 | 0 | 6 |
| WIRELESS COMMUNICATION UNIT | 0 | 1 | 1 | 0 | 2 |

FIG. 3

| | IMPORTANCE | UPPER LIMIT OF OPERATING TEMPERATURE (OC) | ADJUSTABLE RANGE OF ELECTRIC POWER (W) | RESTRICTIONS |
|---|---|---|---|---|
| MAIN CONTROL UNIT | 20 | 75 | 2. 0 (3. 5-5. 5) | NO RESTRICTION |
| METER FUNCTION UNIT | 15 | 75 | 0. 0 | NO RESTRICTION |
| INFOTAINMENT FUNCTION UNIT | 4 | 65 | 5. 0 (10. 0-15. 0) | ·TURN DOWN CLOCK<br>·TURN OFF |
| SOUND OUTPUT UNIT | 6 | 65 | 10. 0 (10. 0-20. 0) | ·TURN DOWN SOUND (VOLUME)<br>·TURN OFF |
| WIRELESS COMMUNICATION UNIT | 2 | 65 | 1. 0 (1. 0-2. 0) | ·TURN DOWN SENSITIVITY OF TRANSMISSION/RECEPTION<br>·TURN OFF |

VEHICLE CONTROL UNIT FOR RESTRICTING OPERATION OF FUNCTIONAL UNIT(S) ACCORDING TO A DETERMINED IMPORTANCE

CROSS REFERENCE TO RELATED APPLICATION

The present application is a continuation application of International Patent Application No. PCT/JP2019/050353 filed on Dec. 23, 2019, which designated the U.S. and claims the benefit of priority from Japanese Patent Application No. 2019-005161 filed on Jan. 16, 2019. The entire disclosures of all of the above applications are incorporated herein by reference.

TECHNICAL FIELD

The present disclosure relates to relates to a vehicle control unit that controls various functions mounted on a vehicle.

BACKGROUND

In recent years, the number of functions installed in vehicles has been increasing, and the control of devices for providing various functions has become complicated. Therefore, in recent years, the development of an integrated system in which a plurality of functions mounted on a vehicle are centrally controlled by one control unit has been promoted. Then, when constructing such an integrated system, there is a difficulty that the importance of the plurality of functions mounted on the vehicle is different. In other words, some of the functions installed in the vehicle are of high importance that the operation should be continued as much as possible even under harsh conditions such as a high temperature environment, and some of the functions are of low importance that the operation can be restricted even if the vehicle is running.

SUMMARY

According to an example, the vehicle control unit includes: a plurality of functional units mounted on the vehicle; a temperature detection unit for detecting temperature; and a controller for controlling an operation of each functional unit. An importance is set for each of the functional units, and the controller executes the operation restriction process that restricts the operation of each functional unit having a low importance according to the temperature detected by the temperature detection unit.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram schematically showing an example of setting importance for a plurality of functional units according to the present embodiment;

FIG. 3 is a diagram showing an example of specifications of a plurality of functional units according to the present embodiment.

DETAILED DESCRIPTION

Here, for example, a conceivable technique teaches a technique for suppressing a temperature rise by periodically detecting a voltage of a plurality of battery stacks and controlling a current in a system in which a plurality of battery stacks are connected. Therefore, if the technique disclosed in Patent Literature 1 is applied to the above-mentioned integrated system, it is considered that the current supplied to various devices can be appropriately controlled, and the temperature rise of the entire system can be suppressed.

However, the technique is a technique of identifying a battery stack in which the current is likely to be suppressed based on the detection result of the voltage of the battery stack, and suppressing the current supplied to the specified battery stack. That is, in the conceivable technique, a plurality of battery stacks are in an equal relationship with each other, and the supplied current of any battery stack is suppressed if the current is likely to be suppressed. Therefore, even if the conceivable technique is applied to the above-mentioned integrated system, it is only possible to suppress the current supplied to the function whose current is likely to be suppressed, and it is not possible to perform various controls flexibly according to the importance of each function.

Therefore, a vehicle control unit capable of appropriately controlling a plurality of functions mounted on a vehicle according to the importance of each function is provided.

In one aspect, the vehicle control unit includes a plurality of functional units mounted on the vehicle, a temperature detection unit that detects the temperature, and a control unit that controls the operation of the functional unit. Then, the importance is set for each of the functional units, and the control unit executes an operation restriction process for limiting the operation of the functional unit having the set low-importance according to the temperature detected by the temperature detection unit.

That is, according to the vehicle control unit according to one aspect, the importance is set for each of a plurality of functional units mounted on the vehicle, and the operation of the functional unit having the high importance is not restricted, but the operation of the functional unit having the low importance is restricted. As a result, it is possible to preferentially limit the functions of low importance while avoiding the limitation of the functions of high importance, and it is possible to appropriately control multiple functions installed in the vehicle according to the importance of each function.

Figure 1:
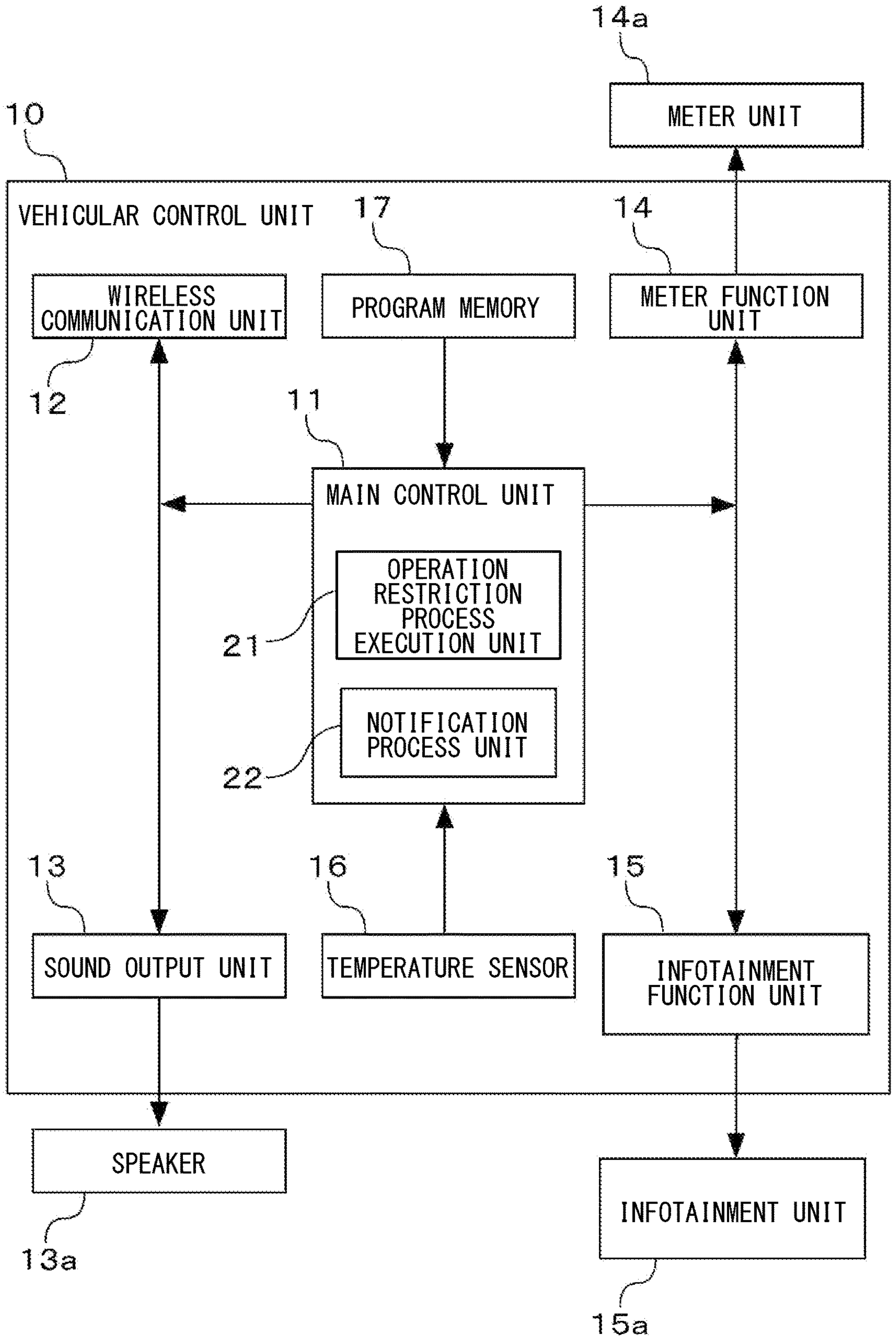
FIG. 1 is a diagram schematically showing a configuration example of a vehicle control unit according to the present embodiment.

Hereinafter, an embodiment relating to the vehicle control unit will be described with reference to the drawings. The vehicle control unit 10 illustrated in FIG. 1 is mounted on a moving body such as a vehicle, and includes a main control unit 11, a wireless communication unit 12, a sound output unit 13, a meter function unit 14, and an infotainment function unit 15, and a temperature sensor 16 and the like. The vehicle control unit 10 constructs a so-called integrated cockpit system that centrally controls a plurality of functions mounted on a moving body such as a vehicle, and can control a plurality of functions by one control unit.

Hereinafter, the components of the vehicle control unit 10 will be described in order. The main control unit 11 is an example of a controller and an example of a functional unit.

The main control unit 11 mainly includes, for example, a microcomputer, and controls the overall operation of the vehicle control unit 10 based on the control program stored in the program memory 17.

The wireless communication unit 12 is an example of a functional unit. The wireless communication unit 12 is configured to include, for example, a well-known wireless communication module, and connects the vehicle control unit 10 to an external device so as to be capable of wireless communication. Examples of wireless communication include, but are not limited to, well-known wireless communication standards such as Bluetooth (registered trademark) and WiFi (registered trademark).

The sound output unit 13 is an example of a functional unit. The sound output unit 13 is configured to include, for example, a well-known speaker 13*a* or an amplifier, and outputs various sounds from the speaker 13*a* based on the sound output signal given from the main control unit 11. Further, the main control unit 11 can adjust the volume of the sound output from the speaker 13*a* by adjusting the amplifier of the sound output unit 13.

The meter function unit 14 is an example of the function unit. Based on the output signal of the meter system image given from the main control unit 11, the meter function unit 14 outputs meter system image information such as the traveling speed of the vehicle and the rotation speed of the engine to the meter of the meter unit 14*a*.

The infotainment function unit 15 is an example of the function unit. The infotainment function unit 15 outputs, for example, infotainment-type video information such as a movie to the display screen of the infotainment unit 15*a* based on the output signal of the infotainment-type video given from the main control unit 11.

The temperature sensor 16 is an example of a temperature detection unit. The temperature sensor 16 is configured to include, for example, a well-known temperature thermistor, and detects the internal temperature of the vehicle control unit 10 or the ambient temperature of the vehicle control unit 10.

Further, the vehicle control unit 10 virtually realizes various processing units such as the operation restriction process execution unit 21 and the notification process unit 22 by software based on the main control unit 11 executing the control program. Various processing units such as the operation restriction process execution unit 21 and the notification process unit 22 may be configured by hardware or may be configured by a combination of software and hardware.

The operation restriction process execution unit 21 is a processing unit that executes an operation restriction process that limits the operation of the function unit of low importance that is set according to the temperature detected by the temperature sensor 16. The details of the operation restriction process will be described later.

The notification process unit 22 is an example of the notification unit, and when the main control unit 11 starts the operation restriction process described later, it notifies fact that the operation restriction process has been started. The notification process by the notification process unit 22 may be an auditory notification mode for performing the notification by voice via the speaker 13*a*, or visual notification mode for performing the notification by the meter unit 14*a* or the infotainment unit 15*a*, or a notification mode for combining an auditory notification mode and a visual notification mode.

In the vehicle control unit 10 according to the present disclosure, importance is set for each of the plurality of functional units 11 to 15. Next, an example of setting the importance will be described. As illustrated in FIG. 2, evaluations are given to the plurality of functional units 11 to 15 from a plurality of viewpoints, in this case, from the viewpoints of legal compliance, user recognition, user requestability, and internal influence. In this case, the evaluation values can be set in multiple stages such as 0 point for "not applicable", 1 point for "almost not applicable", 2 points for "relatively not applicable", 3 points for "relatively applicable", and "generally applicable" and 5 points for "corresponding".

Legal compliance is an evaluation item that is evaluated based on whether or not the function is required to operate according to the provisions of the law. In this case, the function of outputting the image information of the meter system to the meter of the meter unit 14*a* while the vehicle is running has high importance that the operation should be continued as much as possible even under harsh conditions such as a high temperature environment, and the law recommends that the function should be continued to operate as long as possible. Therefore, from the viewpoint of legal compliance, the evaluation values of the main control unit 11 and the meter function unit 14 that are responsible for the operation of this function are 5 points.

User cognition is an evaluation item evaluated from the viewpoint of whether or not the user can easily recognize the influence when the operation of the function is restricted. In this case, the function of outputting the image information of the meter system to the meter of the meter unit 14*a* may be such that the meter unit 14*a* is located in front of the driver's seat, and if the operation of this function is restricted, the image can not be seen, and the influence is easily recognized by the user. Therefore, the evaluation values of the main control unit 11 and the meter function unit 14 that are responsible for the operation of this function are 5 points.

Further, in the function of outputting sound from the sound output unit 13, when the operation of this function is restricted, the volume of the output sound is lowered or disappeared, so that the user can easily recognize the influence. Therefore, the evaluation value of the sound output unit 13 responsible for the operation of this function is 5 points.

In addition, in the function of outputting infotainment-related video information to the display screen of the infotainment unit 15*a*, when the operation of this function is restricted, the image can not be visible, and the user can easily recognize the influence. Therefore, the evaluation value of the infotainment function unit 15 responsible for the operation of this function is 3 points. It should be noted that the infotainment-based video information is less important than the meter-based video information described above from the viewpoint of vehicle travelling function. Therefore, the evaluation value of the infotainment function unit 15 is lower than the evaluation value of the meter function unit 14 described above.

User requestability is an evaluation item evaluated from the viewpoint of whether or not the operation of a function is requested by the user. When the operation of the function requested by the user is restricted, the operation of the function is restricted in spite of the user's request, so that the user can easily recognize the influence. Therefore, a higher evaluation value is set for the function whose operation is required by the user. In the example of FIG. 2, the user requires a function of outputting the image information of the meter system to the meter of the meter unit 14*a*. Therefore, the evaluation values of the main control unit 11 and the meter function unit 14 responsible for the operation of this function are 5 points. The vehicle control unit 10 can receive a request for operation of a function from a user via an operation input unit (not shown). That is, the user can input to the vehicle control unit 10 a request for a function that he/she wants to operate preferentially or a function that he/she does not want to restrict the operation through an operation input unit (not shown).

The internal influence is an evaluation item evaluated from the viewpoint of whether or not the other elements constituting the vehicle control unit 10 are affected when the operation of the function is restricted. For example, when the operation of the control function by the main control unit 11 is restricted, the operation of other elements of the vehicle control unit 10 is also restricted, and the operation thereof is affected. Therefore, the evaluation value of the main control unit 11 is 5 points. On the other hand, with respect to the functional units 12 to 15 other than the main control unit 11, even if the operation of the function is restricted, the influence on other elements is slight or none. Therefore, the evaluation values of the functional units 12 to 15 other than the main control unit 11 are all 0 points in this case.

As described above, the plurality of functional units 11 to 15 included in the vehicle control unit 10 are evaluated based on a plurality of viewpoints as described above. Then, the total of the evaluation values based on such a plurality of viewpoints is set as the importance of the functional unit. In this case, the importance of the main control unit 11 is "20", the importance of the wireless communication unit 12 is "2", the importance of the sound output unit 13 is "6", and the importance of the meter function unit 14 is "15", and the importance of the infotainment function unit 15 is "4".

Further, the specifications of the plurality of functional units 11 to 15 included in the vehicle control unit 10 are different from each other. As illustrated in FIG. 3, the main control unit 11 has an upper limit of the temperature range in which operation is permitted is 75° C., and the adjustable range of the supplied power is 2.0 W from 3.5 W to 5.5 W. Further, in the wireless communication unit 12, the upper limit of the temperature range in which the operation is allowed is 65° C., and the adjustable range of the supplied power is 1.0 W from 1.0 W to 2.0 W. Further, the sound output unit 13 has an upper limit of the temperature range in which the operation is allowed is 65° C., and the adjustable range of the supplied power is 10.0 W from 10.0 W to 20.0 W. Further, the meter function unit 14 has an upper limit of the temperature range in which operation is permitted is 75° C., and the adjustable range of the supplied power is 0.0 W, that is, it cannot be adjusted. Further, the infotainment function unit 15 has an upper limit of the temperature range in which the operation is permitted is 65° C., and the adjustable range of the supplied electric power is 5.0 W from 10.0 W to 15.0 W.

Further, in this case, the restrictions for restricting the operation of the plurality of functional units 11 to 15 included in the vehicle control unit 10 are set as follows.

That is, since the function of the main control unit 11 is a function that controls the overall operation of the vehicle control unit 10, it is basically set not to be restricted.

Further, when the function of the wireless communication unit 12 is limited, the sensitivity of transmission/reception is lowered by suppressing the power supplied to the wireless communication unit 12. Alternatively, when the function of the wireless communication unit 12 is restricted, the supply of electric power to the wireless communication unit 12 may be stopped.

Further, when the function of the sound output unit 13 is limited, the volume of the output sound is suppressed by suppressing the power supplied to the sound output unit 13. Alternatively, when the function of the sound output unit 13 is restricted, the supply of electric power to the sound output unit 13 may be stopped.

Further, the function of the meter function unit 14 is basically set not to be limited because the adjustable range of the supplied power is 0.0 W and cannot be adjusted.

Further, when the function of the infotainment function unit 15 is restricted, the power supplied to the infotainment function unit 15 is suppressed to reduce the clock down, that is, the drawing speed or the response speed is reduced. Alternatively, when the function of the infotainment function unit 15 is restricted, the supply of electric power to the infotainment function unit 15 may be stopped.

In the vehicle control unit 10 configured as described above, the main control unit 11 is configured to perform an operation restriction process that limits the operation of the set less important functional unit according to the temperature detected by the temperature sensor 16. Hereinafter, a case where the operation of the infotainment function unit 15 having a lower importance than that of the main control unit 11 and the meter function unit 14 is restricted will be described as an example.

Figure 4:
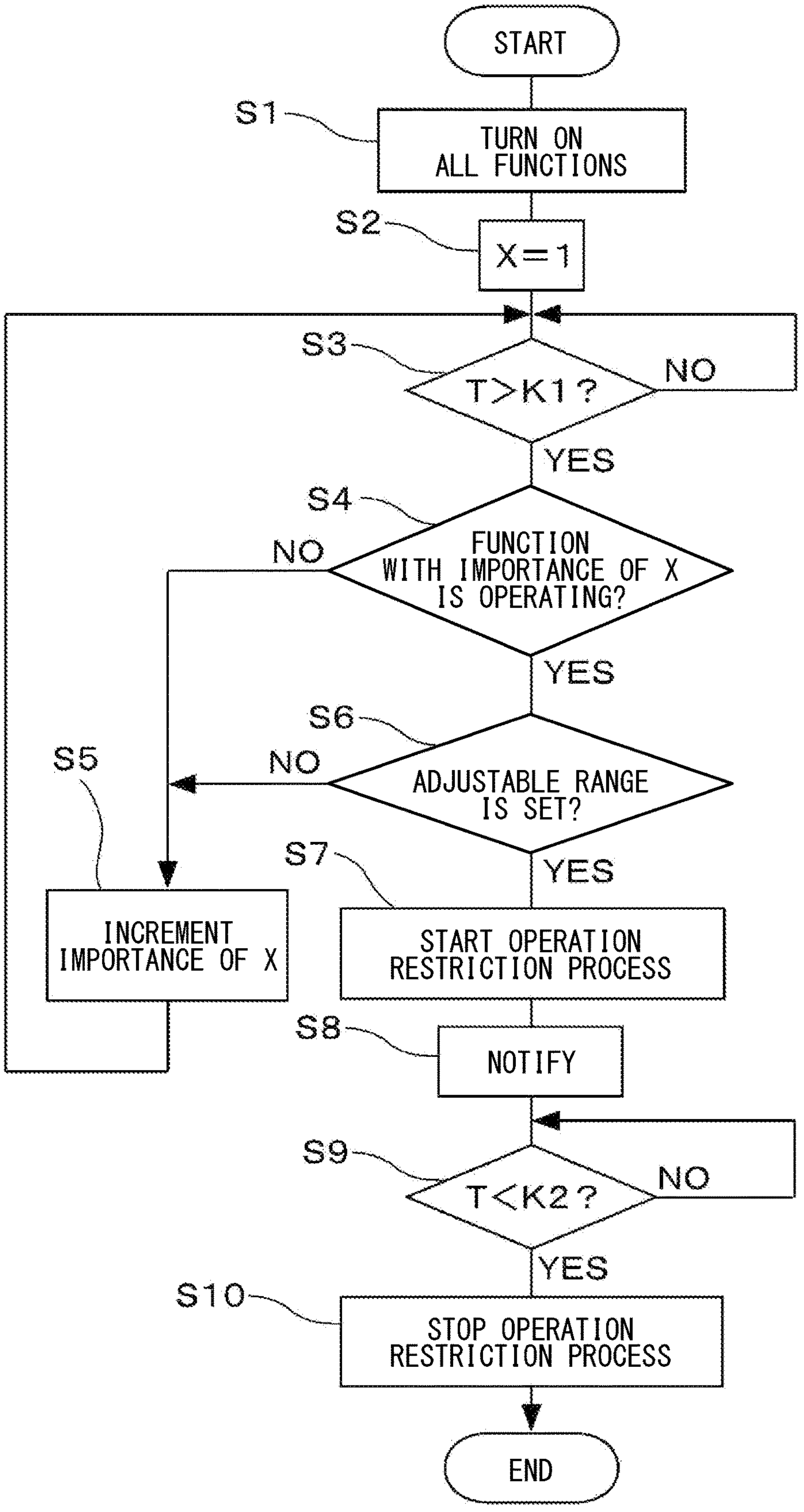
FIG. 4 is a flowchart schematically showing an operation example of a vehicle control unit according to the present embodiment.

As illustrated in FIG. 4, when the main control unit 11 is activated from the sleep state, a plurality of units are activated, in this case, all the functional units 12 to 15 are activated (at S1). The main control unit 11 may activate some predetermined functional units instead of all the functional units. Then, the main control unit 11 sets the numerical value of 1 in the importance variable X for the infotainment function unit 15 (at S2). Then, the main control unit 11 determines whether or not the temperature T detected by the temperature sensor 16 exceeds the reference temperature K1 for the infotainment function unit 15 (at S3). The reference temperature K1 for the infotainment function unit 15 can be appropriately changed and set. For example, the upper limit value of the allowable operating temperature of the vehicle control unit 10 or each function unit, for example, the infotainment function unit 15 may be set as the reference temperature k1. Alternatively, the reference temperature K1 may be set to be temperature lower by a predetermined temperature, for example, about 5° C. than the upper limit of the allowable operating temperature of the vehicle control unit 10 or each functional unit, for example, the infotainment function unit 15.

When the temperature T detected by the temperature sensor 16 does not exceed the reference temperature K1 for the infotainment function unit 15 ("NO" at S3), the main control unit 11 stands by as it is. On the other hand, when the temperature T detected by the temperature sensor 16 exceeds the reference temperature K1 for the infotainment function unit 15 ("YES" at S3), the main control unit 11 determines whether or not the infotainment function unit 15 for which the importance is set to be the value of the importance variable X at that time is operating (at S4). In this case, 4 is set as the importance of the infotainment function unit 15. Therefore, if the value of the importance variable X at that time is not 4, the main control unit 11 makes a negative determination in step S4 and proceeds to step S5. When the main control unit 11 proceeds to step S5, the value of the importance variable X is incremented, that is, increased by 1, and the process proceeds to step S3.

On the other hand, when the value of the importance variable X at that time is 4, the main control unit 11 makes an affirmative determination in step S4 and proceeds to step S6. When the main control unit 11 proceeds to step S6, the main control unit 11 confirms whether or not the adjustable range of the supplied electric power is set in the infotainment function unit 15 that has been positively determined in step S4. That is, the main control unit 11 confirms whether or not it is possible to limit the operation of the functional unit that has been positively determined in step S4. The main control unit 11 increments the value of the importance variable X (at S5) when the adjustable range of the supplied power is not set in the infotainment function unit 15 that has been determined affirmatively in step S4. Then, the process proceeds to step S3.

On the other hand, the main control unit 11 starts the operation restriction process that limits the operation of the infotainment function unit 15 when the adjustable range of the supplied power is set in the infotainment function unit 15 that has been determined affirmatively in step S4 (at S7). As a result, the power to be supplied to the infotainment function unit 15 that is positively determined in step S4 is adjusted so as to be suppressed, and the operation of the infotainment function unit 15 is restricted. Further, when the main control unit 11 starts the operation restriction process for limiting the operation of the infotainment function unit 15, it notifies that the operation restriction process of the infotainment function unit 15 has been started (at S8).

Then, the main control unit 11 determines whether or not the temperature T detected by the temperature sensor 16 is lower than the reference temperature K2 for stopping the operation restriction process (at S9). The reference temperature K2 for stopping the operation restriction process can be appropriately changed and set. For example, the lower limit value of the allowable operating temperature of the vehicle control unit 10 or each function unit, for example, the infotainment function unit 15 may be set as the reference temperature k2. Alternatively, the reference temperature K2 may be set to be temperature higher by a predetermined temperature, for example, about 5° C. than the lower limit of the allowable operating temperature of the vehicle control unit 10 or each functional unit, for example, the infotainment function unit 15.

When the temperature T detected by the temperature sensor 16 is not lower than the reference temperature K2 for stopping the operation restriction process ("NO" at S9), the main control unit 11 continues to perform the operation restriction process of the infotainment function unit 15. Further, at this time, the main control unit 11 may perform the operation restriction process similarly executed for another function unit of low importance, in this case, the wireless communication unit 12 in which the importance is set to 2, or the sound output unit 13 in which the importance is set to 6 as well. In this way, by sequentially limiting the operation of the set functional units of relatively low importance, the temperature T detected by the temperature sensor 16, that is, the internal temperature of the vehicle control unit 10, or the ambient temperature of the vehicle control unit 10 can be lowered more quickly.

On the other hand, when the temperature T detected by the temperature sensor 16 is lower than the reference temperature K2 for stopping the operation restriction process ("YES" at S9), the main control unit 11 stops the operation restriction process (at S10), and this control is terminated.

That is, according to the vehicle control unit according to one aspect of the present disclosure, the importance is set for each of a plurality of functional units 11 to 15 mounted on the vehicle, and the operation of the functional unit having the comparatively high importance is not restricted, but the operation of the functional unit having the comparatively low importance is restricted. As a result, it is possible to preferentially limit the functions of comparatively low importance while avoiding the limitation of the functions of comparatively high importance, and it is possible to appropriately control multiple functions installed in the vehicle according to the importance of each function.

Further, according to the vehicle control unit 10, the notification process unit 22 can notify that the operation restriction process has been started by the main control unit 11. According to this configuration, the user can recognize that the operation of the functional unit mounted on the vehicle is intentionally restricted based on the notification process by the notification process unit 22, and, for example, it is possible to avoid misunderstanding that a difficulty has occurred in the functional unit.

Further, according to the vehicle control unit 10, it is possible to continue the operation of important functions as much as possible by setting a high degree of importance to the functional unit such as a functional unit that is required to operate while the vehicle is running, for example, a functional unit that is required to operate by a user, a functional unit whose operation is recommended by law, and the like.

Further, according to the vehicle control unit 10, it is possible to restrict the operation of the less-important function to suppress an increase in the internal temperature or the ambient temperature of the vehicle control unit 10 while continuing the operation of the important function as much as possible, by setting a low degree of importance to the functional unit such as a functional unit whose operation is not required while the vehicle is running, for example, a functional unit whose operation is not required by the user, a functional unit whose operation is not recommended by law, and the like.

The present disclosure is not limited to the above-described embodiment, and various modifications and extensions can be made without departing from the gist thereof. For example, the functional unit provided in the vehicle control unit 10 may not be limited to the functional unit exemplified in the above-described embodiment, and various functional units can be applied as long as they can be mounted on the vehicle.

Further, the method of setting the importance for a plurality of functional units may not be limited to the method exemplified in the above-described embodiment, and for example, various methods may be adopted depending on the vehicle type, the law, the user's preference, the characteristics of the functional unit mounted on the vehicle and the like.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

What is claimed is:

1. A vehicle control unit comprising:

a plurality of functional units mounted on a vehicle;

a temperature detection unit that detects a temperature; and a controller for controlling an operation of each functional unit;

wherein:

an importance is set for each of the functional units;

the importance of each functional unit is a total numerical value of evaluation values based on a plurality of viewpoints, each evaluation value having a predetermined numerical value;

the controller executes an operation restriction process for restricting the operation of each functional unit having a low importance according to the temperature detected by the temperature detection unit;

the controller executes the operation restriction process from a lowest importance to a predetermined importance;

the evaluation values include: a legal compliance evaluation value; a user recognition evaluation value; a user requestability evaluation value; and an internal influence evaluation value;

the legal compliance evaluation value is evaluated based on whether or not each functional unit is required to operate according to provisions of a law and is set in multiple stages based on whether each functional unit is required to operate according to the provisions of the law, with 0 points indicating that the functional unit is not required to operate according to the provision of the law and 5 points indicating that the functional unit is required to operate according to the provisions of the law;

the user recognition evaluation value is evaluated from a viewpoint of whether or not an user can easily recognize an influence when the operation of each functional unit is restricted and is set in multiple stages based on whether the user can easily recognize the influence when the operation of each functional unit is restricted, with 1 point indicating that the user cannot easily recognize the influence when the operation of the functional unit is restricted, 5 points indicates that the user can easily recognize the influence when the operation of the functional unit is restricted, and 3 points indicates that the user can recognize the influence when the operation of the functional unit is restricted more easily than a functional unit that is assigned 1 point and less easily than a functional unit that is assigned 5 points;

the user requestability evaluation value is evaluated from the viewpoint of whether or not the operation of each functional unit is requested by the user and is set in multiple stages based on whether the operation of each functional unit is requested by the user, with 1 point indicating that the operation of the functional unit is not requested by the user and 5 points indicating that the operation of the functional unit is requested by the user;

the internal influence evaluation value is evaluated from the viewpoint of whether or not any of the functional units constituting the vehicle control unit are affected when the operation of one or more functional units is restricted and is set in multiple stages based on whether each functional unit is affected when the operation of the one or more functional units is restricted with 0 points indicating that the operation of the functional unit is not affected when the operation of the one or more functional units is restricted and 5 points indicating that the operation of the functional unit is affected;

an applicability of evaluation for each evaluation value of 0 points is smaller than an applicability of evaluation for each evaluation value of 1 point;

an applicability of evaluation for each evaluation value of 1 point is smaller than an applicability of evaluation for each evaluation value of 2 points;

an applicability of evaluation for each evaluation value of 2 points is smaller than an applicability of evaluation for each evaluation value of 3 points;

an applicability of evaluation for each evaluation value of 3 points is smaller than an applicability of evaluation for each evaluation value of 4 points;

an applicability of evaluation for each evaluation value of 4 points is smaller than an applicability of evaluation for each evaluation value of 5 points;

the controller executes the operation restriction process for restricting the operation of each functional unit based on a sum of the evaluation values associated with the functional unit, wherein a functional unit having a lower associated evaluation value being subject to more restriction than a functional unit having a higher associated evaluation value;

when the temperature detected by the temperature detection unit does not exceed a first reference temperature for each functional unit, the controller does not execute the operation restriction process;

the controller executes the operation restriction process only in response to both the sum of the evaluation value associated with each functional unit being between 0 points and a predetermined importance threshold and the temperature exceeding the first reference temperature for each functional unit, and does not execute the operation restriction process in response to the evaluation value associated with each functional unit not being between 0 points and the predetermined importance threshold and in response to the temperature being less than the first reference temperature for each functional unit; and when the temperature is lower than a second reference temperature for each functional unit, the controller stops executing the operation restriction process, the first reference temperature being greater than the second reference temperature.

2. The vehicle control unit according to claim 1, wherein:

a high importance is set for each of the functional units that are required to operate while the vehicle is actually travelling.

3. The vehicle control unit according to claim 1, wherein:

the low importance is set for each of the functional units that are not required to operate while the vehicle is actually travelling.

4. The vehicle control unit according to claim 1, further comprising:

a notification process unit for notifying that the operation restriction process has been started by the controller by executing at least one of an auditory notification or a visual notification to a user.

* * * * *